United States Patent
Silva (10) Patent No.: US 8,257,012 B2
(45) Date of Patent: Sep. 4, 2012

(54) PROCESS AND APPARATUS FOR PICKING UP, TRANSFERRING AND DEPOSITING A WHOLE LAYER OF PRODUCTS TO BE PALLETIZED

(75) Inventor: Valentina Silva, Montecchio Emilia (IT)

(73) Assignee: Emmeti S.p.A., Montecchio Emilia (IT)

( * ) Notice: Subject to any disclaimer, the term of this patent is extended or adjusted under 35 U.S.C. 154(b) by 379 days.

(21) Appl. No.: 12/095,770

(22) PCT Filed: Nov. 23, 2006

(86) PCT No.: PCT/EP2006/011244
§ 371 (c)(1),
(2), (4) Date: Jun. 2, 2008

(87) PCT Pub. No.: WO2007/062778
PCT Pub. Date: Jun. 7, 2007

(65) Prior Publication Data
US 2008/0292444 A1 Nov. 27, 2008

(30) Foreign Application Priority Data
Dec. 2, 2005 (IT) .............................. PR2005A0075

(51) Int. Cl.
B65B 35/30 (2006.01)
(52) U.S. Cl. ................... 414/799; 414/793.5; 414/792.6
(58) Field of Classification Search ................ 198/429, 198/632, 861.2; 254/112; 269/289 MR; 414/789.5, 791.6, 792.6, 792.8, 793.4, 793.5, 414/793.6, 799, 927; 475/145, 158, 263, 475/269, 325, 331, 335, 340; 74/29, 31, 74/33, 422, 89.11, 89.17–89.19
See application file for complete search history.

(56) References Cited

U.S. PATENT DOCUMENTS

| 3,830,081 | A * | 8/1974 | Weber et al. ................... 464/17 |
| 4,856,263 | A * | 8/1989 | Schneider et al. .............. 53/543 |
| 6,341,698 | B1 * | 1/2002 | Wursthorn .................... 209/552 |
| 6,533,533 | B1 * | 3/2003 | Heston ........................ 414/791.6 |
| 6,691,874 | B2 * | 2/2004 | Wursthorn .................... 209/552 |
| 2005/0265816 | A1 * | 12/2005 | Blanc .......................... 414/799 |
| 2005/0265817 | A1 * | 12/2005 | Blanc .......................... 414/799 |
| 2006/0269389 | A1 * | 11/2006 | Bolzani ........................ 414/799 |

FOREIGN PATENT DOCUMENTS
DE 3117492 A1 * 11/1982
EP 0 257 447 A2 3/1988
EP 1 457 442 A1 9/2004
(Continued)

Primary Examiner — Gregory Adams
(74) Attorney, Agent, or Firm — Young & Thompson (57) ABSTRACT

A process and associated apparatus (1) for picking up, transferring and depositing a whole layer of products to be palletized, the pickup apparatus (1) including a flexible loading surface (5) which is movable between two positions, a wound position for defining a bottom opening, and a deployed position for closing the opening to thereby define the loading surface, the motion being driven by an associated motor unit (17). In the pickup process, the layer of containers is reached by the flexible loading surface (5) in a wound position to be introduced in such configuration in the apparatus. The layer of containers therein introduced is transferred onto the flexible surface by retracting the pickup apparatus. Actuation occurs either after disconnecting the drive between the flexible loading surface (5) and the associated motor unit or by synchronizing the unit with the arms of the corresponding robot (2) associated to the apparatus.

15 Claims, 13 Drawing Sheets

FOREIGN PATENT DOCUMENTS

| | | | | |
|---|---|---|---|---|
| FR | 2427977 | A | * | 2/1980 |
| FR | 2723732 | A1 | * | 2/1996 |
| JP | 04303327 | A | * | 10/1992 |
| JP | 2003192133 | A | * | 7/2003 |
| WO | 2006/000847 | A2 | | 1/2006 |
| WO | 2006/126043 | A1 | | 11/2006 |

* cited by examiner

PROCESS AND APPARATUS FOR PICKING UP, TRANSFERRING AND DEPOSITING A WHOLE LAYER OF PRODUCTS TO BE PALLETIZED

The present invention relates to a process and apparatus for picking up, transferring and depositing a whole layer of products to be palletized.

For many years it has been known to palletize whole layers of objects, such as boxes, bundles or glass bottles, coming from one or more conveyor lines, and prepared on a platform at the end of the line, in such arrangement as to cover the whole surface of the pallet on which they are to be placed.

Pickup and handling operations are carried out using gantry or anthropomorphic robots having a particular pickup head which is designed to pick up a whole layer and place it on the pallet.

The most widely used and known pickup heads are of the slat-conveyor or flexible loading surface type, in which the objects to be palletized are introduced in and handled on the flexible surface.

Objects are loaded basically in two different manners:
- By independent pushing means, usually mounted to the end portion of the layer supporting platform, which load the layer of products onto the flexible loading surface,
- By head-mounted loading means, which consist of one or more telescopic means projecting out of the head, when appropriate, and centering over the layer to pull it back onto the flexible loading surface.

In greater detail, according to the latter variant, the head is moved closer to the stationary layer of containers, with the telescoping carriage in a cantilever position with respect to the handling head and the flexible loading surface of the head in the deployed position.

Then, the head is lowered for the telescopic carriage to center over the containers to be picked up and the telescopic carriage is pulled back into the handling head with the containers thereon, to move the containers onto the flexible loading surface of the head, which is known in the art as slat conveyor.

In short, the head:
1. reaches the pickup station by its cantilever telescopic carriage and with the flexible surface in the deployed position;
2. centers the layer of containers by its telescopic carriage and lowers the pickup head;
3. pulls the telescopic carriage back into the head;
4. conveys the layer onto the flexible surface.

The object of the present invention is to provide a novel method or process for picking up a layer of containers as defined in claim 1; such process being carried out using a pickup head as defined in claim 9.

The present process is advantageous in that it does no longer need a telescopic handling member and the motor unit associated thereto, which increase the final product costs as well as the work for the design of the pickup head, which would be much more stressed by the weight of the cantilever member.

These objects and advantages are achieved by the process and apparatus for picking up, transferring and depositing a whole layer of products to be palletized according to this invention, which is characterized by the annexed claims.

These and other features will be more apparent upon reading the following description of a few embodiments, which are shown by way of example and without limitation in the accompanying drawings, in which:

FIG. 11bis shows a variant embodiment of a means for modulating the drive as shown in FIG. 11;

Referring to FIGS. 1, 2, 3, 4, 5, 6, 7 and 8, these show the steps whereby a layer of containers 3 is picked up by a pickup apparatus, generally designated by numeral 1.

Figure 1:
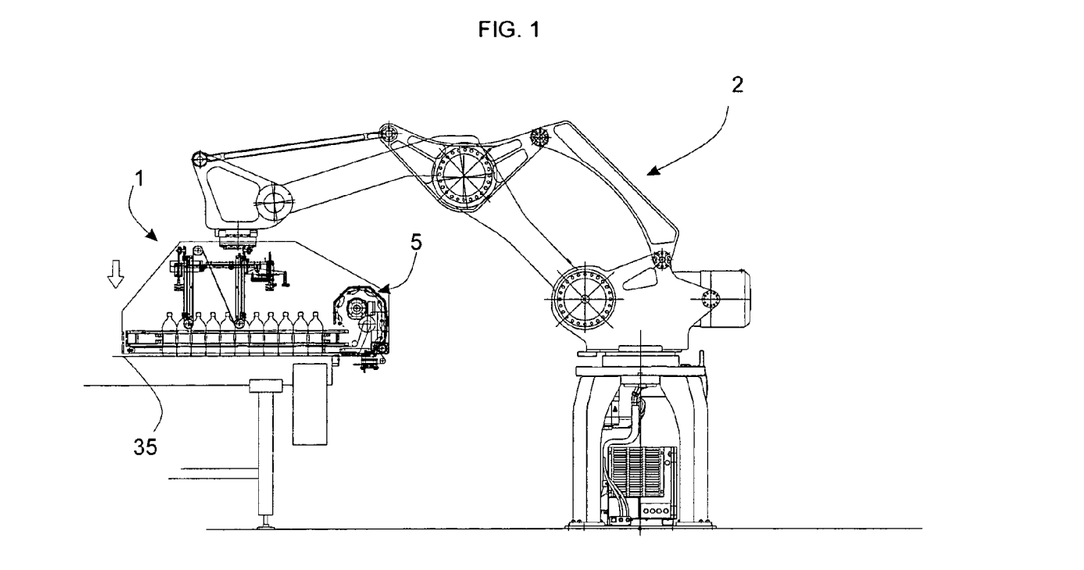
FIG. 1 is a side view of a robotized palletizing unit for carrying out the pickup process of the invention, in the approaching and centering step.
Figure 2:
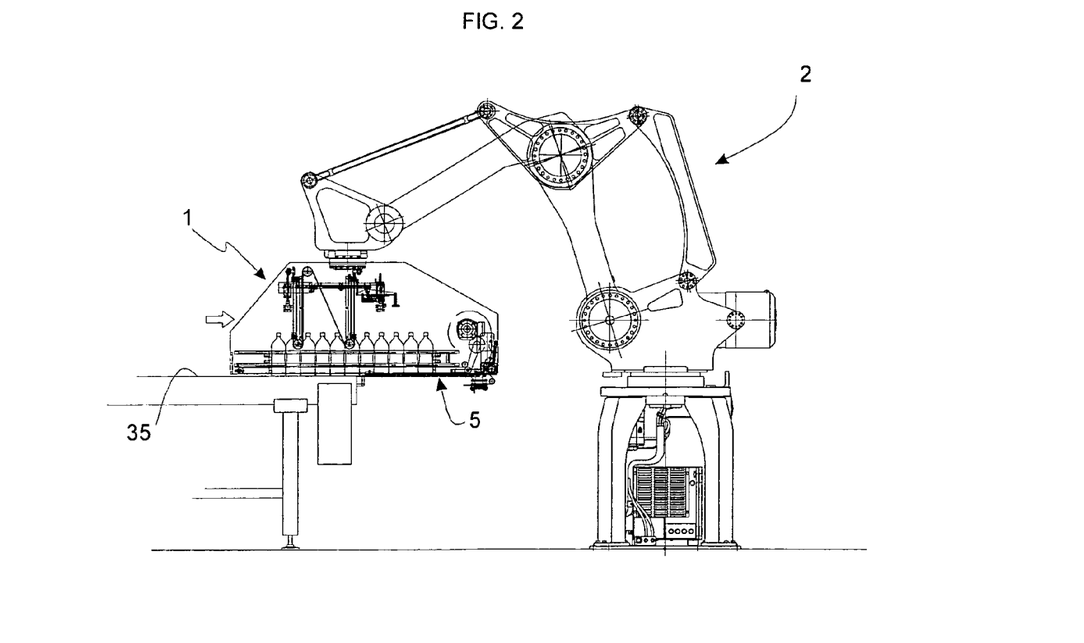
FIG. 2 shows the robotized palletizing unit for carrying out the process, during the loading step.
Figure 3:
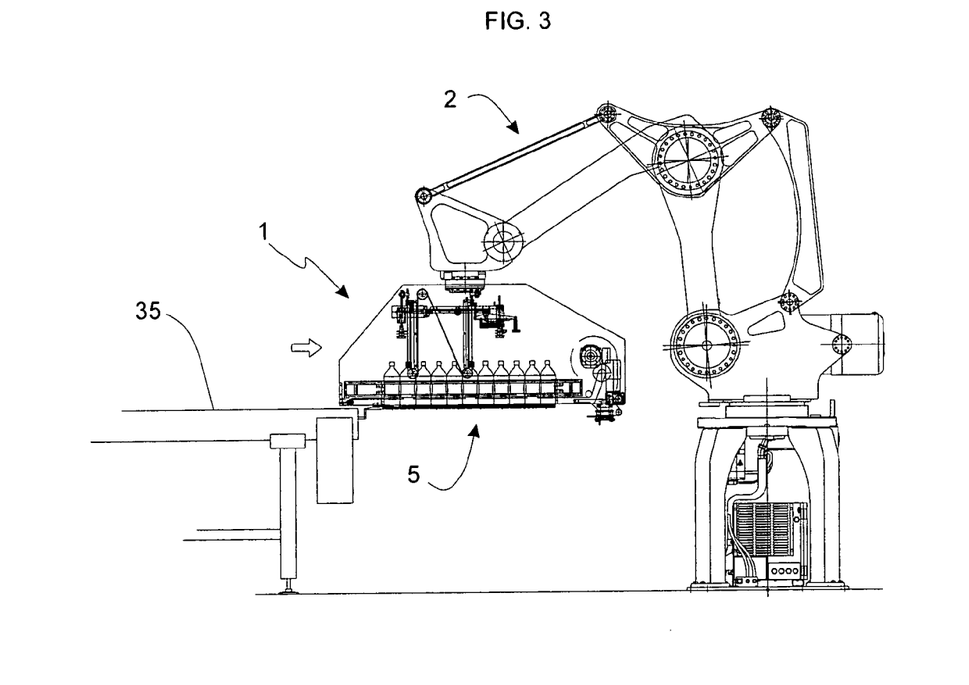
FIG. 3 shows the robotized palletizing unit for carrying out the process, at the end of the loading step.
Figure 4:
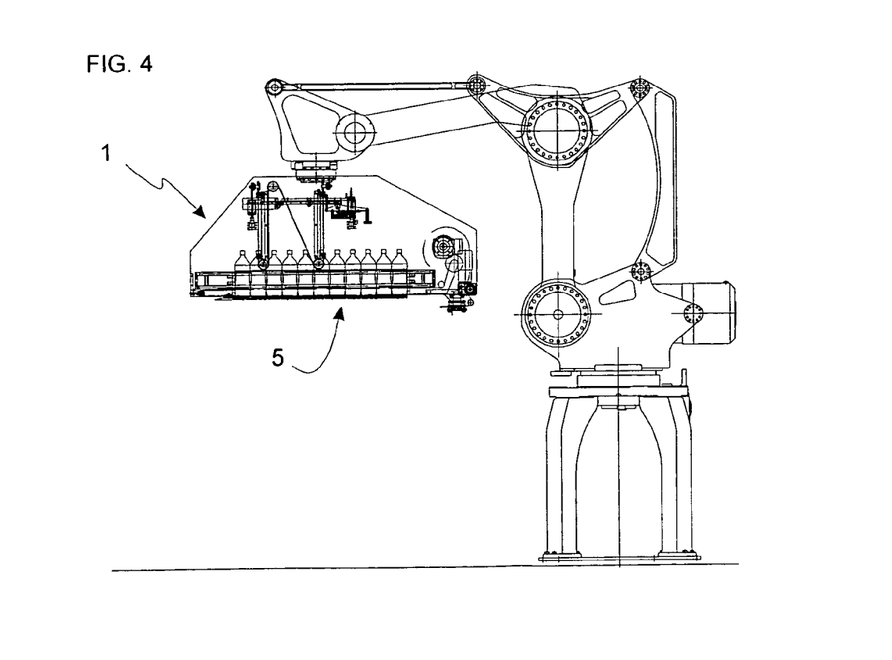
FIG. 4 shows the robotized palletizing unit with the containers loaded on the flexible loading surface, ready to be moved to the palletizing station.

Such apparatus 1 is usually anchored by a suitable known support system to a robotized handling structure, in this example an anthropomorphic robot 2, although this example may be extended to other automatic guide systems.

The layer of containers 3 is generally prepared in a suitable stationary platform 35, which is situated in the end section of an item conveying system, e.g. a belt or chain conveyor.

The pickup apparatus 1 will be extensively described after disclosure of the pickup process, whose first step consists in driving the apparatus 1 closer to the layer of containers 3 to be picked up, and place it above the latter.

Then, the pickup apparatus 1 is lowered onto the layer so that the containers 3 are centered and enclosed by suitable centering means which are provided inside the casing or framework of the apparatus.

The process described above is carried out with the flexible loading platform 5 in a collapsed position, i.e. contained in the apparatus, as shown in FIG. 1, thereby forming a free bottom opening for picking up the containers 3.

As the apparatus 1 is lowered to incorporate the layer of containers 3 therein, the flexible loading surface 5 is anchored to a fastening means 50 which is integral with the stationary platform 35.

Such fastening means 50 fits into the end section of the surface 5, which is usually known as loading skid, although this specification shall not be intended to limit the requested protection but as an application example.

After such anchorage and before displacing the apparatus, the drive between the flexible loading surface 5 and motor unit associated thereto is disconnected.

Once the loading surface has been disconnected from the frame-mounted motor unit of the apparatus 1, any translation in a direction opposite to the above mentioned approaching motion causes the loading surface 5 to deploy along special guides 16 as described below.

In other words—according to this first embodiment—the loading surface 5 is deployed by the translational motion of the apparatus 1 and the means for anchorage or connection to the pickup platform; with no intervention of the associated motor unit, which is conveniently disconnected by means of a drive modulation member.

FIGS. 5, 6, 7 and 8 show the above steps of the process with the pickup apparatus 1 in greater detail.

Figure 5:
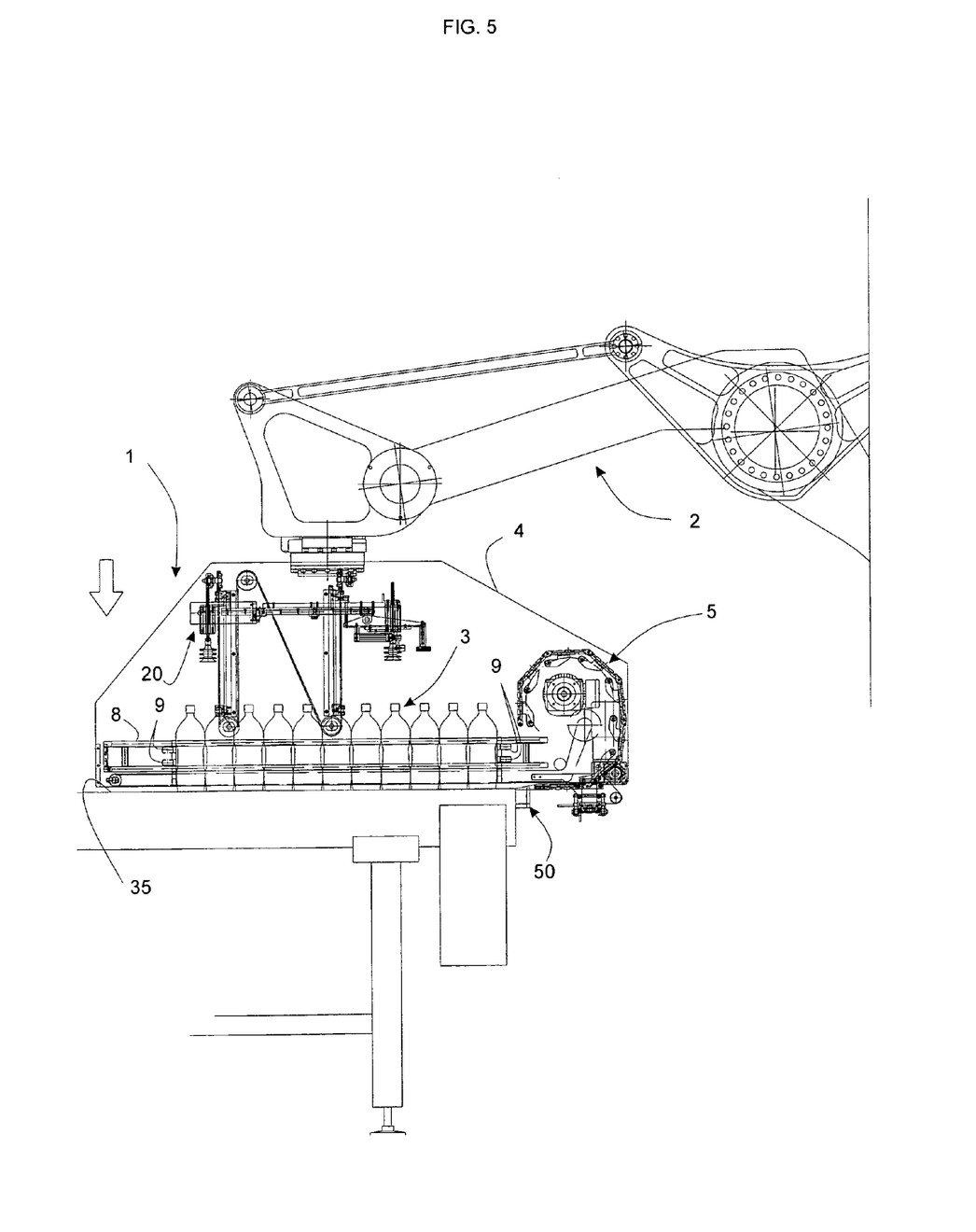
FIG. 5 shows a close-up view of the approaching and centering step as shown in FIG. 1.

In FIG. 5, the apparatus 1 is lowered and centers the layer by its centering means 8 and 9, which are formed of longitudinal and transverse bars.

At the same time, the end section of the flexible surface 5, still in the wound position, couples with the means 50.

Figure 6:
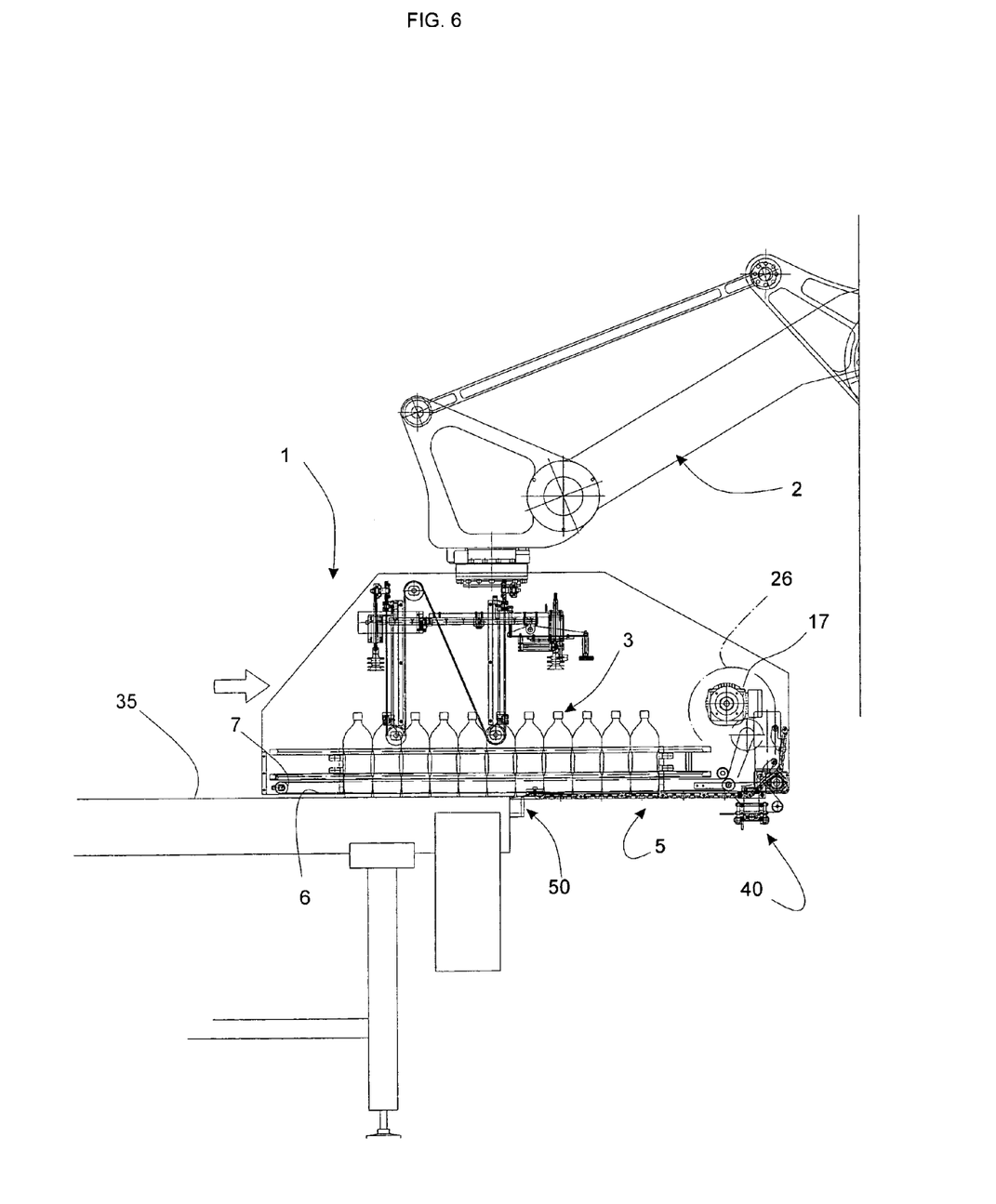
FIG. 6 shows a close-up view of the loading step as shown in FIG. 2.

FIG. 6 represents an instant of the above mentioned opposite translational motion in which the apparatus 1 itself loads the layer as the surface deploys along its slide guides (which are shown in the next figures).

Figure 7:
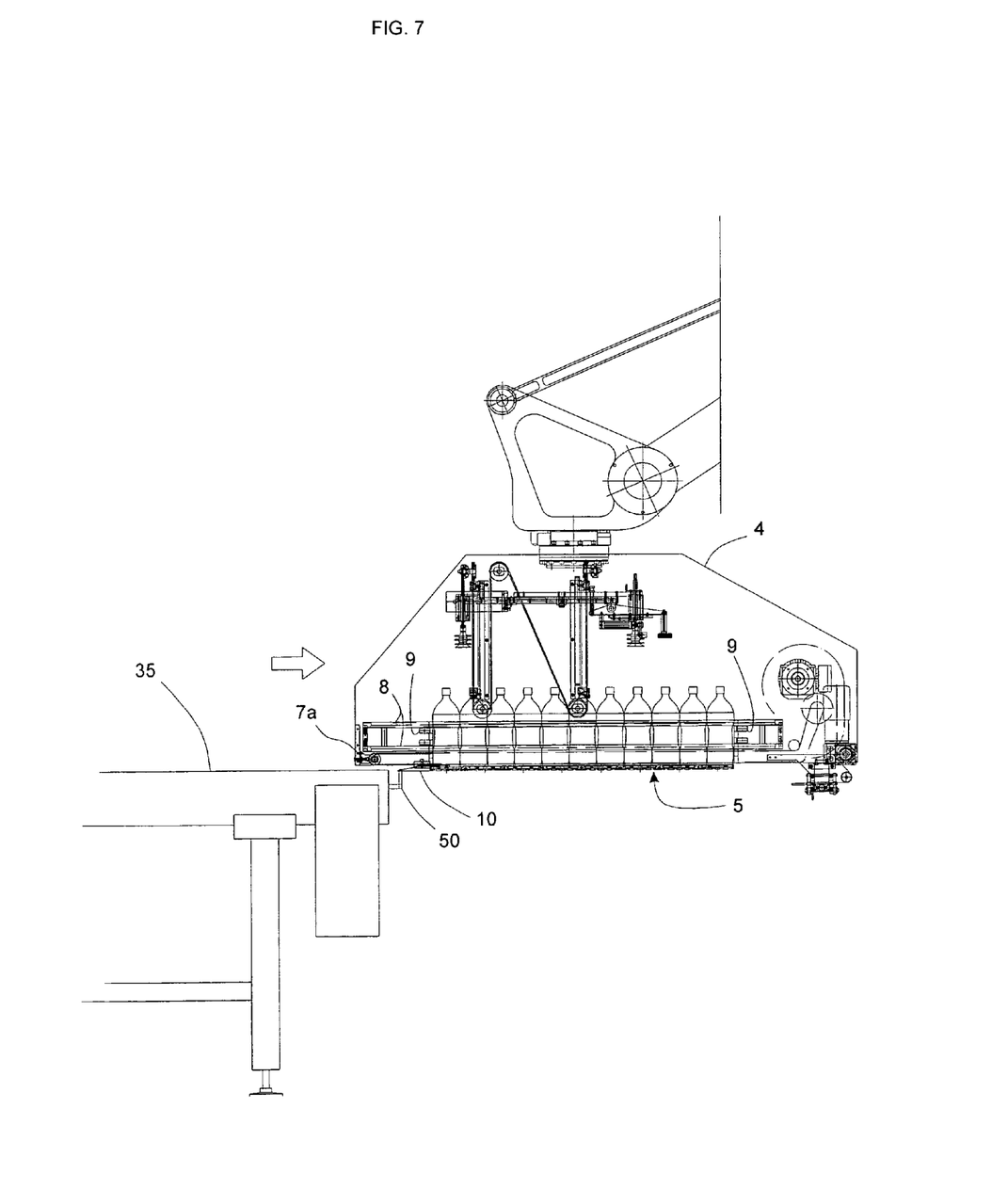
FIG. 7 shows a close-up view of the end of the loading step as shown in FIG. 3.
Figure 8:
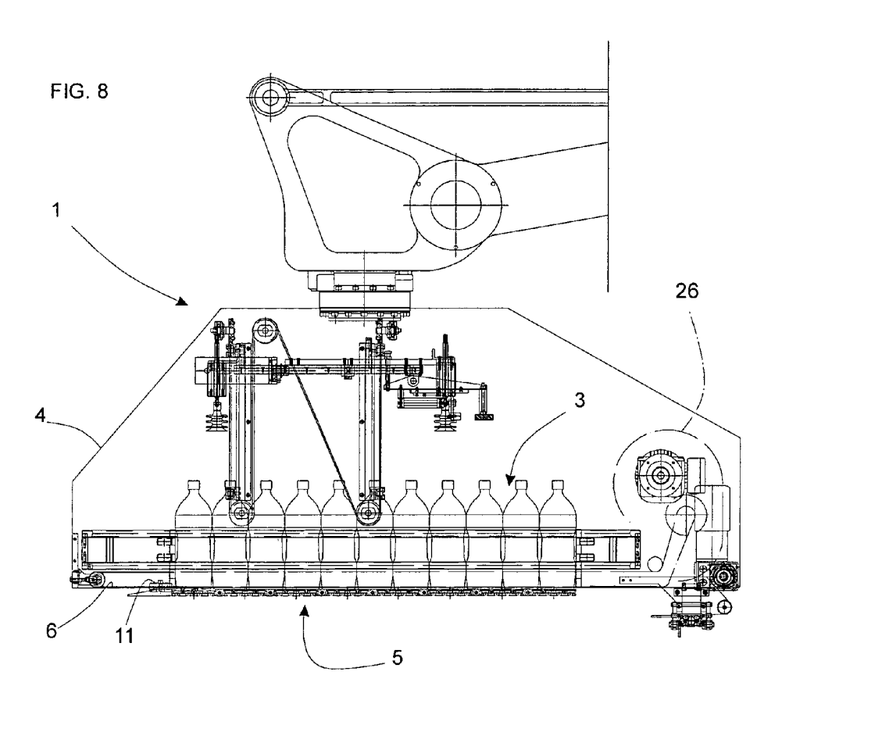
FIG. 8 shows a close-up view of the pickup step as shown in FIG. 4.

FIG. 7 illustrates the situation at the end of the above translational motion, in which the whole layer of containers 3 is on the surface 5; the next lifting action of the apparatus 1 disconnects the means 50 from the pickup head, as shown in FIG. 8.

In an alternative solution, the flexible surface 5 may be automatically disconnected from the fastening means 50, upon retraction of the head 1, more precisely when the surface is completely deployed.

Now, the connection between the motor unit and the loading surface 5 is restored, to control rewinding of the latter for palletizing.

Figure 9A:
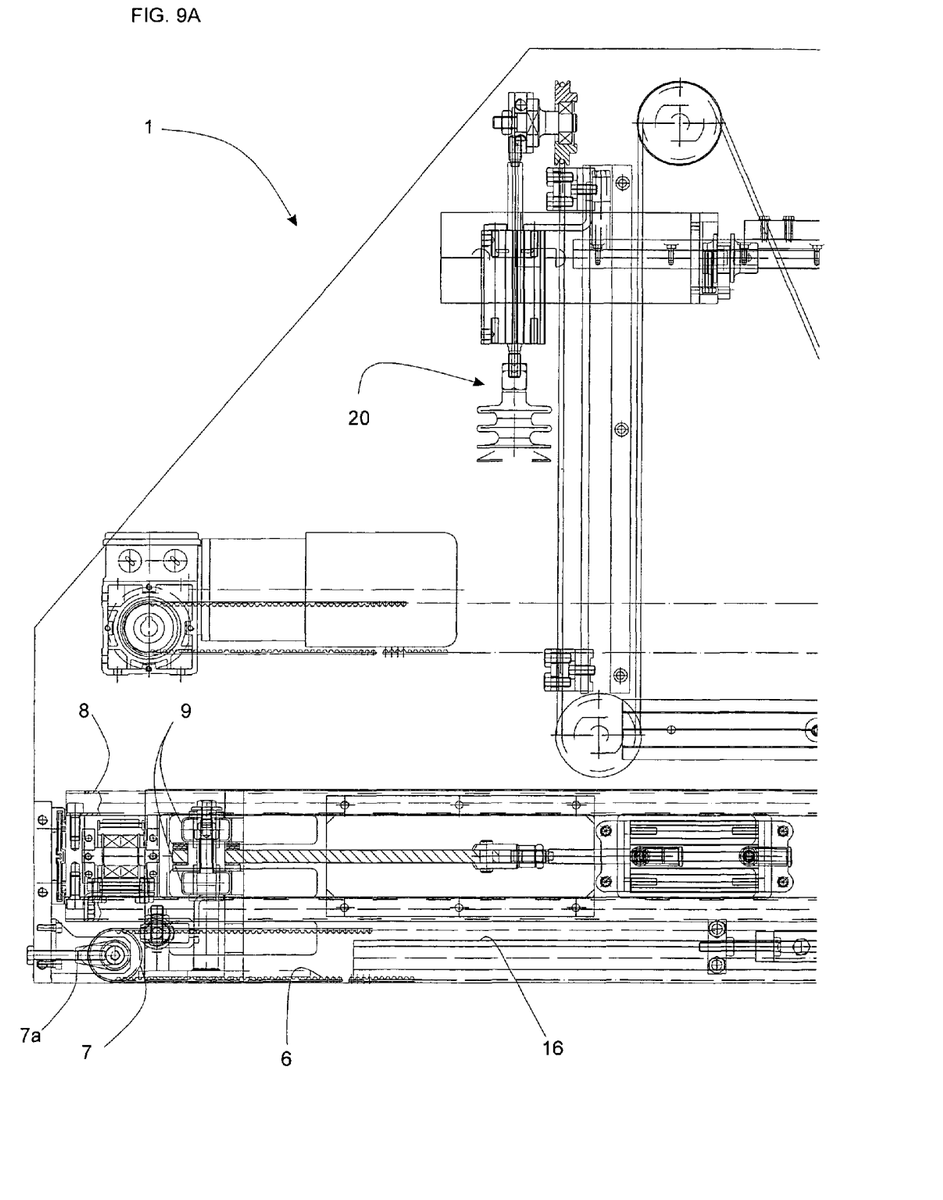
FIG. 9A is a side view of a portion of a wider palletizing head for carrying out the present process, which head is shown as a whole in FIGS. 9, 10 and 11.
Figure 9B:
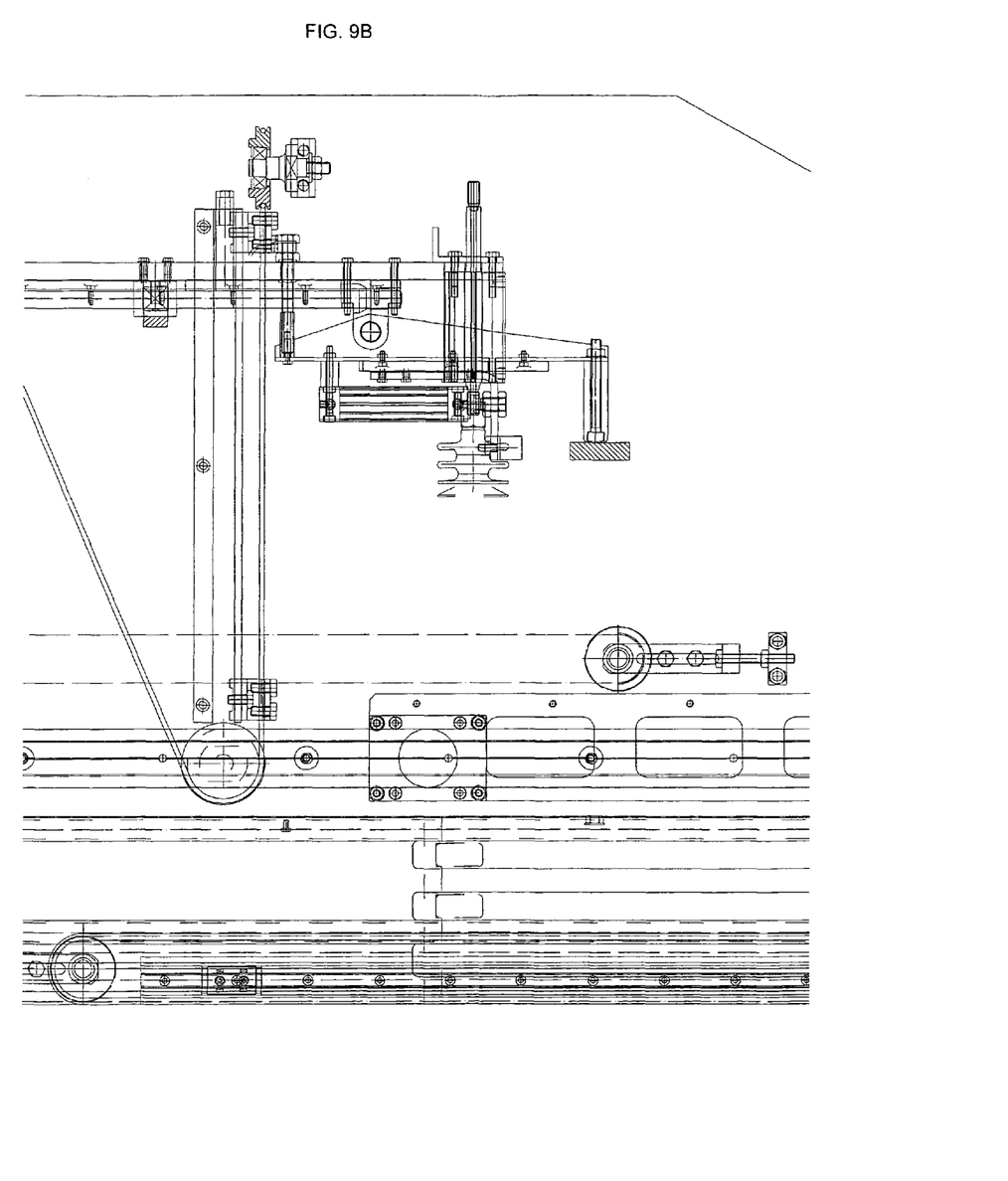
FIG. 9B shows the central part of the palletizing head portion.
Figure 9C:
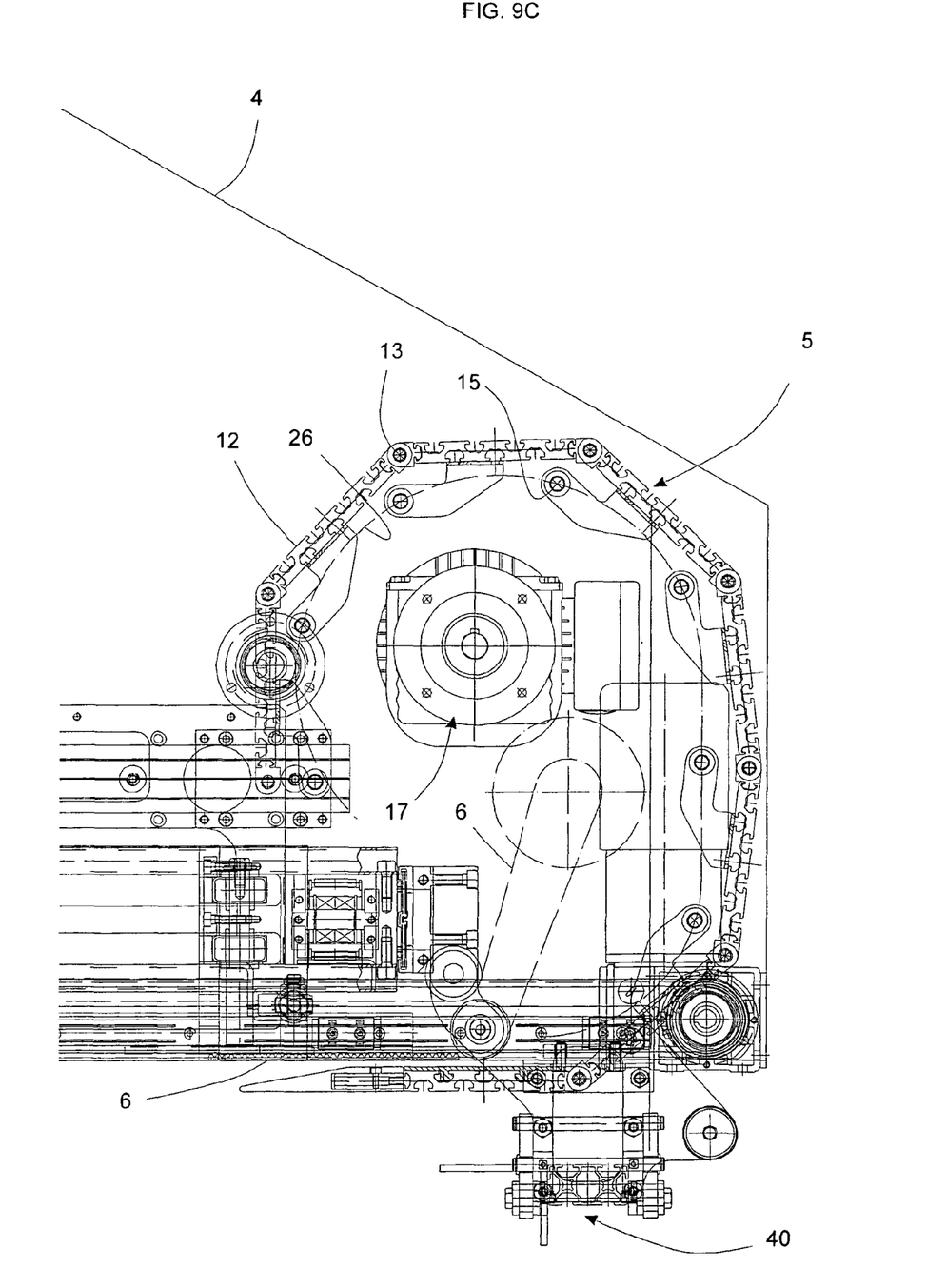
FIG. 9C shows the external portion of the palletizing head.

An example of apparatus 1 for carrying out the present pickup process is shown in detail in the three FIGS. 9A, 9B, 9C, which are to be intended as a single drawing in its general interpretation; the figures shall be examined in the above order, from left to right.

The pickup apparatus 1 has a framework enclosed by a casing 4 which defines, as mentioned above, a bottom opening, which may be closed by actuation of the flexible loading surface 5.

The surface 5 is displaceable between two positions, a winding position in which a bottom opening is left, and a deploying position in which such opening is closed, and the loading surface is thereby defined.

Figure 10:
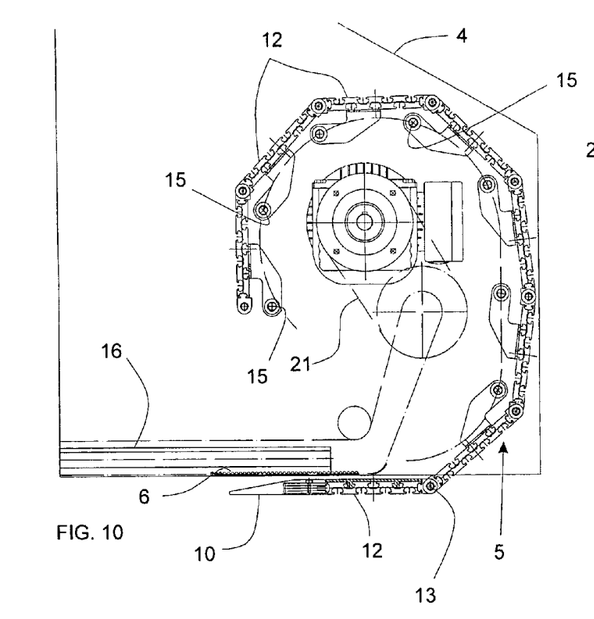
FIG. 10 shows a side detail of the flexible loading surface, in a wound configuration thereof, and the means for guiding and handling it.
Figure 11:
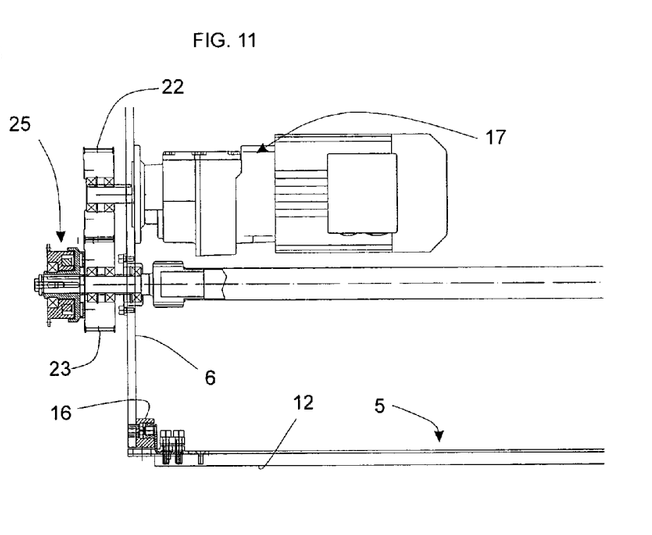
FIG. 11 is a rear view of FIG. 12.
Figure 13:
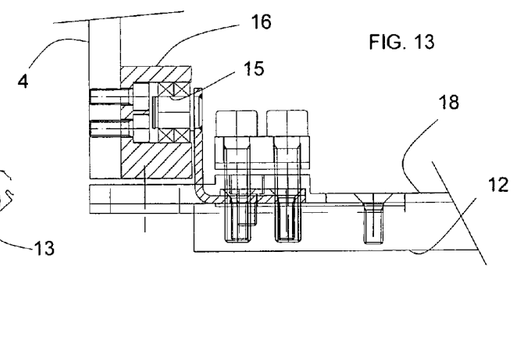
FIG. 13 shows a detail of the sliding area as shown in FIG. 11.

FIGS. 10, 11 and 13 show the motor unit 17 for the surface 5 and one of the slide guides 16.

More specifically, the flexible loading surface 5 is driven by a belt 6 which is wound and tightened between two pulleys 7 and 23; connection between the loading surface 5 and the belt 6 being provided by a fastener block 11.

The pulley 23 in turn has a mechanical transmission (drive belt 21) which connects it to the pulley 22 of the gearmotor 17.

FIG. 11 also shows a drive modulation means 25, more specifically a claw clutch, which is used to disconnect transmission of motion between the motor unit 17 and the flexible loading surface 5, for said flexible loading surface to be free of sliding in its corresponding guide means, designated by numeral 16 in this figure.

FIG. 11b is shows a variant of the possible claw clutch which is used to disconnect the elements 5 and 17.

The drive modulation member 25 may be placed either on the belt driving pulley 23 (like in the example) and on the pulley 22 of the motor unit 17.

Sliding along the guides 16 occurs by means of joints 15 connected to each module 12 that forms the loading surface 5.

Figures 11, 14, 15:
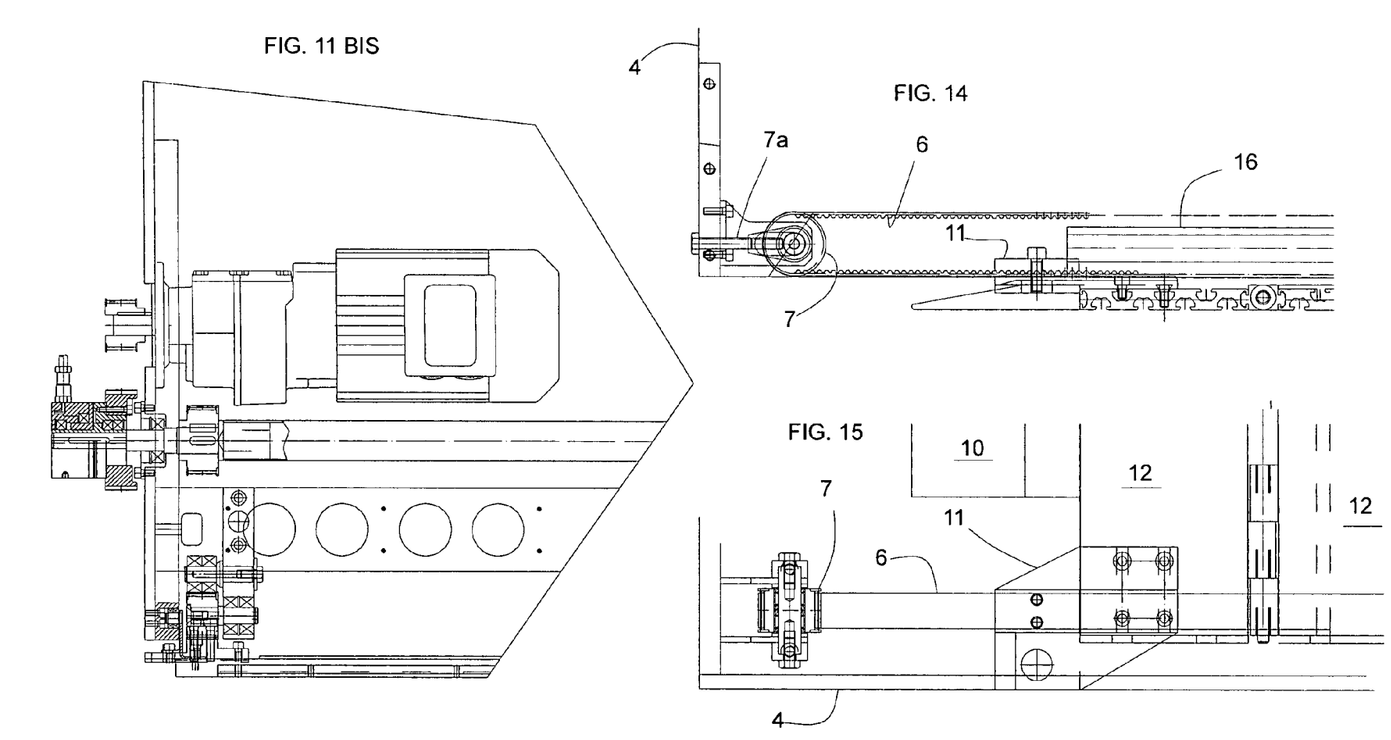
FIG. 14 is a detail view of the system for securing the flexible loading surface and the means for driving it.
FIG. 15 is a top view of the detail of FIG. 16.

These modules 12 are joined together by suitable connecting hinges 13, as shown in FIG. 15.

Figure 12:
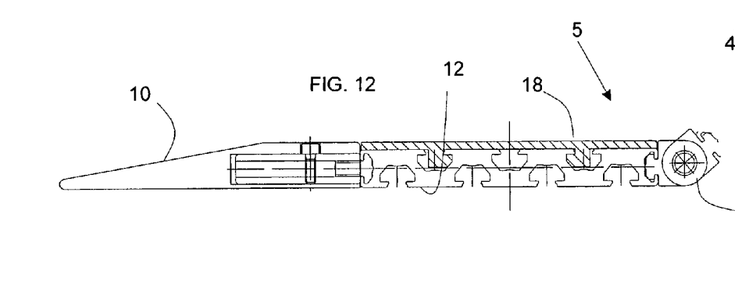
FIG. 12 is a detail view of a section of the flexible loading surface as shown in FIG. 10.

Each module 12, as shown in FIG. 12, has a number of cavities which allow anchorage of a top cover plate 18, to prevent module replacement in case of surface wear.

The front or end section of the surface 5 has a loading skid 10 for facilitating loading operations.

The line designated by numeral 26 (FIG. 10) is the handling line of the loading surface 5 and shall be intended as the line of passage of the corresponding joints 15, the corresponding guide 16 having the same shape, not shown in this example for convenience.

Figure 16:
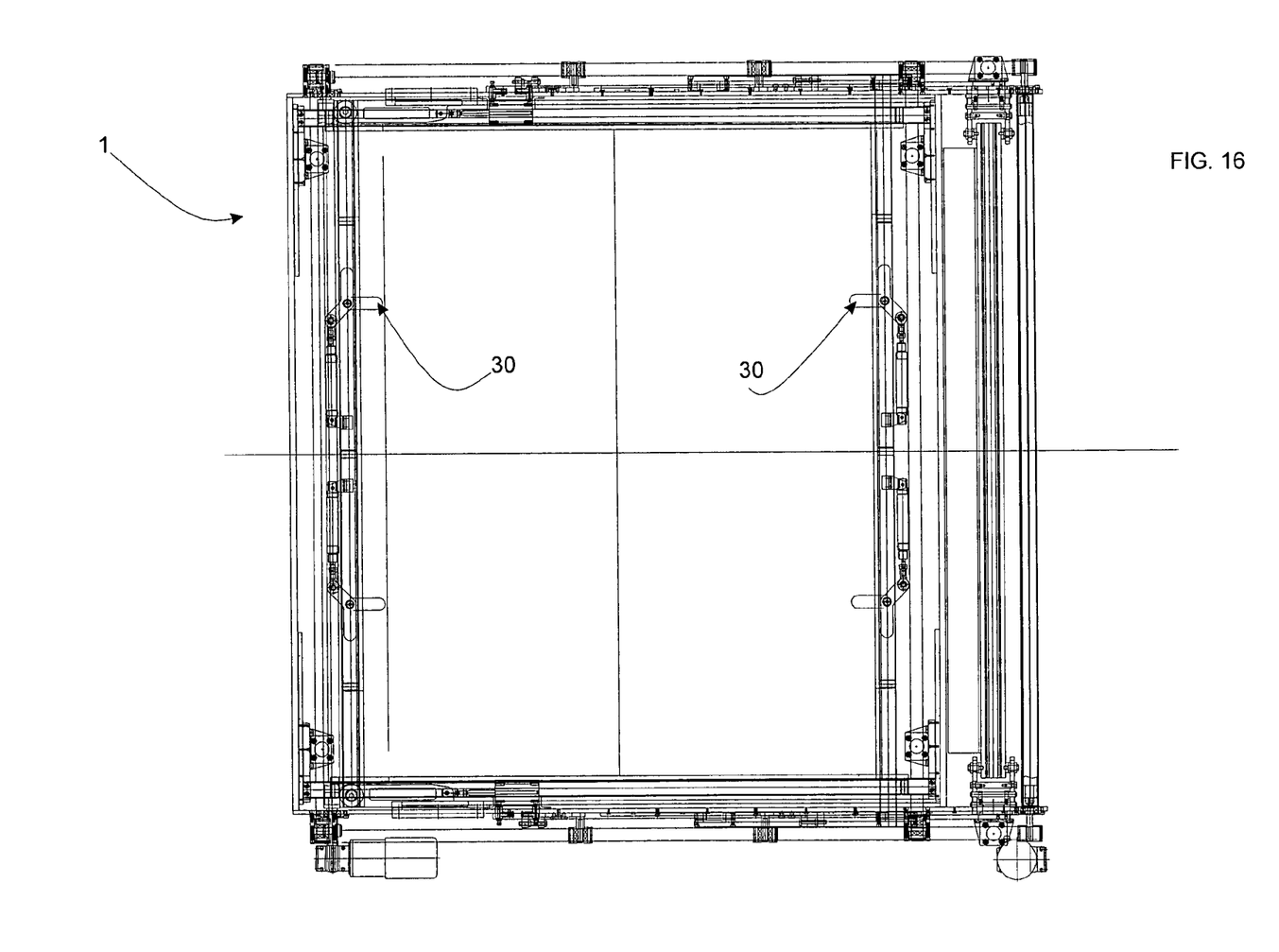
FIG. 16 is a top view of the pickup apparatus and its centering means.
Figure 17:
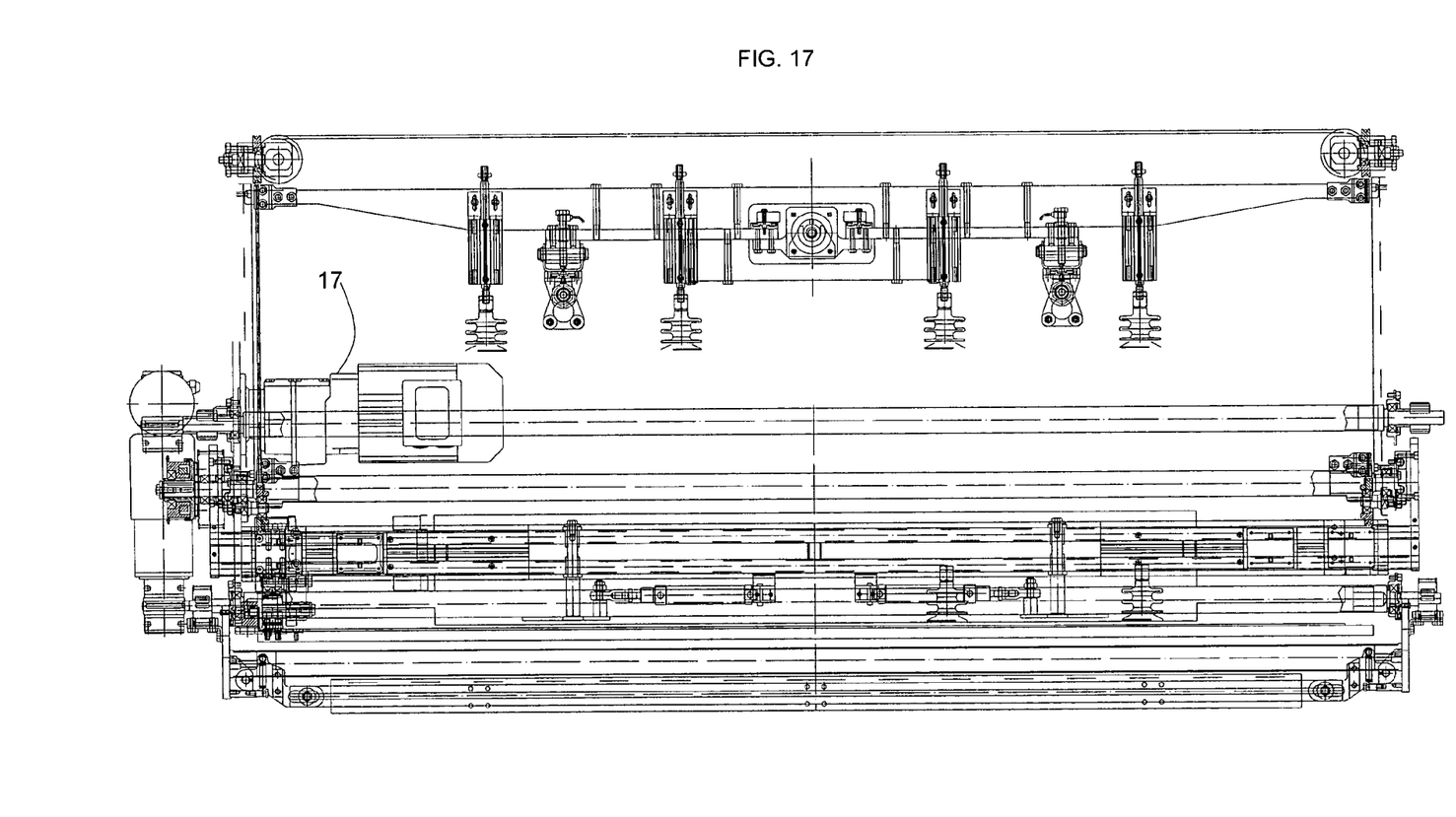
FIG. 17 is a front view of the pickup apparatus for carrying out the present process.

The apparatus 1 may have a sheet pickup unit 20 and/or a frame pickup unit, to be installed therein as appropriate, as well as a pallet pickup unit, which is designated by numeral 30 in FIG. 16.

The sheet and/or frame pickup unit 20 allows to lay a sheet, i.e. a thin divider between the layers, on the picked up layer, and to simultaneously deposit both.

The frame, if any, will be grasped before picking up the last layer of objects to be palletized.

The pallet unit 30 further allows appropriate handling and placement of empty pallets.

Such devices, which are known per se, may be conveniently used with the present apparatus 1.

Finally, the apparatus 1, as mentioned above, has layer centering means, which are formed of transverse and longitudinal bars 8 and 9.

These bars may be displaced to compact the containers 3 during loading or to adapt the apparatus 1 to different layer sizes.

Such displacement may be obtained using any kind of motor unit, for driving belts and carriages and/or by pneumatic cylinders.

Also, the illustrated apparatus 1 may include a sheet locking unit 40 for securing the sheet of the previously transferred and deposited layer.

According to a further variant embodiment, the fastening means 50 may be independent in a well precise and fixed position, e.g. secured to the ground.

Reference has been made in this embodiment, to an apparatus and a process in which transferring occurs after disconnection of the above mentioned motor unit 17.

Nevertheless, without departure from the scope of this invention, according to a variant that is not shown, the motor unit might drive the deployment of the flexible loading surface 5, once the layer of containers 3 has been introduced in the centering means 8 and 9, at the same time as the translational or retracting motion of the pickup apparatus 1.

In other words, synchronization may be provided between the drive of the motor unit 17 and the arms of the robot 2, as if—as defined in the art—the robot 2 had an additional handling arm, provided by the motor unit 17.

In this variant, the fastening means 50 is no longer required, as the flexible surface 5 is automatically deployed during retraction of the head 1.

In short, the present process allows to transfer the layer onto the flexible loading surface 5 by retraction of the head 1.

During such retraction, said flexible surface 5, which was previously maintained in a wound position to define the centering opening in the apparatus 1, is simultaneously deployed.

The surface 5 may be deployed either by the operation of a drive modulation member 25 or by appropriately synchronizing the drive unit 17 with the handling arms of the robot 2, to deploy the surface 5 during the above mentioned retraction.

Such synchronization may be provided by a computer having a microprocessor and dedicated software for matching the retracting translational motion imparted to the robot with an appropriate rotation of the motor unit 17 for deployment of the corresponding loading surface 5.

Reference has been always made in the above example to a modular loading surface 5, but the invention also contemplates equivalent solutions, such as side-by-side rollers, without departure from the scope thereof.

The invention claimed is:

1. A process for picking up, transferring and depositing a whole layer of products to be palletized, comprising:
    providing a pickup apparatus (1) that comprises a flexible loading surface (5) which is movable between i) a wound position for defining a bottom opening, and ii) a deployed position for closing said opening to thereby define the loading surface, said motion being driven by an associated motor unit (17);
    reaching a layer of containers (3) with the flexible loading surface (5) in the wound position;
    centering the layer of containers (3) between centering means (8, 9), the centering means (8, 9) provided inside a casing (4) of the pickup apparatus (1); and
    transferring the layer of containers (3) onto the loading surface (5), said transfer including the substeps of retracting the pickup apparatus (1) and simultaneously deploying the flexible loading surface (5) to slide within a corresponding guide means (16),
    wherein the flexible loading surface is driven by a belt wound and tightened between a first pulley (7) and a second pulley (23), the flexible loading surface and the belt connected by a fastener block, and the first and second pulleys are configured to draw the flexible loading surface in any of a first and an opposite second direction by said motor unit (17),
    wherein the flexible loading surface (5) is freely deployed upon disconnection of a drive between the flexible loading surface (5) and the motor unit (17) associated thereto by means of a drive modulation means (25), and
    wherein the flexible loading surface (5) reconnects with the motor unit (17) at the end of the transferring step.

2. The process as claimed in claim 1, including the substep of anchoring the flexible loading surface (5) to a fastening means (50).

3. The process as claimed in claim 2, including the substep of disconnecting the flexible loading surface (5) from the fastening means (50) at the end of the transferring step.

4. The process as claimed in claim 3, wherein the disconnecting substep is carried out by an operation of the apparatus (1) itself.

5. The process as claimed in claim 1, wherein the pickup apparatus (1) is handled by a robotized means (2) whereto said pickup apparatus (1) is anchored.

6. The process as claimed in claim 2, wherein the fastening means (50) is integral with the stationary platform.

7. A pickup apparatus (1) for picking up, transferring and depositing a layer of products to be palletized, comprising:
    a handling robot, including a handling arm;
    a palletisation head, including a support anchored to the handling arm, and a casing (4) surrounding and connected to said framework and also connected to the support;
    two guide means (16) provided opposite each other and secured to the sides of the framework;
    a flexible loading surface (5) movable within the two guide means (16) between a wound first position defining a bottom opening in the palletisation head and a deployed second position that closes said opening to define a loading surface of the palletisation head;
    a deployment device for moving the flexible loading surface (5) from the first position to the second position, the deployment device comprising a first pulley at (7) a first end of the palletisation head and a second pulley (23) at a second end of the palletisation head, the first and second pulleys (7, 23) driven by a first belt (6) connected to both the first and second pulleys (7, 23), the first belt (6) being connected to the flexible loading surface (5) by a fastener block (11);
    centering means (8, 9) provided inside the casing (4) for centering the layer to be picked up; and
    control means configured to operate a movement of the handling arm of the handling robot,
    wherein the control means is configured to cause the handling arm to, in a first step, position the palletisation head upon the stationary platform such that i) the centering means encloses and holds the layer, and ii) an end section of the flexible loading surface in the first position is aligned with an end of the stationary platform,
    wherein the control means is further configured to cause the handling arm to, in a second step, impart a translational motion upon the palletisation head to retract the palletisation head away from the stationary platform, and
    wherein, during the second step, the deployment device causes the flexible loading surface (5) to be drawn from the first position to the second position in synchronization with the retraction of the palletisation head, thereby to at least partially occlude the opening and support said layer upon the loading surface.

8. The pickup apparatus of claim 7,
    wherein the deployment device is a coupler at the end section of the flexible loading surface configured to couple with a fastening means affixed to the stationary platform,
    wherein the palletisation head, in the first step, is positioned upon the stationary platform such that the coupler at the end section of the flexible loading surface anchors to the fastening means of the stationary platform, and
    wherein the translational motion of the second step retracts the palletisation head away from the stationary platform such that the flexible loading surface anchored to the fastening means is drawn from the first position to the second position.

9. The pickup apparatus of claim 7,
    wherein the deployment device is a motor unit (17) configured to drive the flexible loading surface between the first position and the second position,
    wherein the control means is configured to synchronize an operation of the motor unit with the translational motion of the palletisation head by the handling arm.

10. The pickup apparatus of claim 9, further comprising:
    a drive modulation member (25) configured to disconnect transmission of motion between the motor unit and the flexible loading surface.

11. The pickup apparatus of claim 9, wherein the second pulley (23) is in mechanical connection with a third pulley (22) of the motor unit (17).

12. The pickup apparatus of claim 7, wherein the support anchoring the palletisation head to the handling arm is mounted at a top of the palletisation head.

13. A process for picking up, transferring and depositing a whole layer of products to be palletized, comprising:

providing a pickup apparatus (1) that comprises a flexible loading surface (5) which is movable between i) a wound position for defining a bottom opening, and ii) a deployed position for closing said opening to thereby define the loading surface, said motion being driven by an associated motor unit (17);

reaching a layer of containers (3) with the flexible loading surface (5) in the wound position;

centering the layer of containers (3) between centering means (8, 9), the centering means (8, 9) provided inside a casing (4) of the pickup apparatus (1); and transferring the layer of containers (3) onto the loading surface (5), said transfer including the substeps of retracting the pickup apparatus (1) and simultaneously deploying the flexible loading surface (5) to slide within a corresponding guide means (16), wherein the flexible loading surface is driven by a belt wound and tightened between a first pulley (7) and a second pulley (23), the flexible loading surface and the belt connected by a fastener block, and the first and second pulleys are configured to draw the flexible loading surface in any of a first and an opposite second direction by said motor unit (17), and wherein the flexible loading surface (5) is deployed by means of the motor unit (17), an actuation of the motor unit (17) being synchronized with an axial handling of a robot (2) for driving the pickup apparatus (1), the motor unit (17) becoming an additional arm for the robot (2).

14. The process as claimed in claim 13, wherein a computer, comprising a microprocessor, is used for matching the retracting translational motion imparted to the robot (2) with a rotation of the motor unit (17) to deploy the flexible loading surface (5).

15. The process as claimed in claim 13, wherein the pickup apparatus (1) is handled by a robotized means (2) whereto said pickup apparatus (1) is anchored.

* * * * *